(12) United States Patent
Mori et al.

(10) Patent No.: US 11,580,473 B2
(45) Date of Patent: Feb. 14, 2023

(54) ENGINEERING SUPPORT SYSTEM, ENGINEERING SUPPORT METHOD, CLIENT DEVICE, AND STORAGE MEDIUM

(71) Applicant: YOKOGAWA ELECTRIC CORPORATION, Tokyo (JP)

(72) Inventors: Hiroshi Mori, Tokyo (JP); Nobuaki Ema, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 65 days.

(21) Appl. No.: 16/113,745

(22) Filed: Aug. 27, 2018

(65) Prior Publication Data
US 2019/0066019 A1 Feb. 28, 2019

(30) Foreign Application Priority Data
Aug. 29, 2017 (JP) .............................. JP2017-164741

(51) Int. Cl.
| | |
|---|---|
| *G06Q 10/00* | (2012.01) |
| *G06Q 10/0631* | (2023.01) |
| *G06Q 10/10* | (2023.01) |
| *H04L 9/40* | (2022.01) |
| *G06Q 10/0637* | (2023.01) |
| *G06Q 10/0639* | (2023.01) |
| *G06Q 10/0633* | (2023.01) |

(52) U.S. Cl.
CPC ... *G06Q 10/06316* (2013.01); *G06Q 10/0633* (2013.01); *G06Q 10/0637* (2013.01); *G06Q 10/06398* (2013.01); *G06Q 10/063114* (2013.01); *G06Q 10/103* (2013.01); *H04L 63/08* (2013.01)

(58) Field of Classification Search
CPC ..... G06Q 10/06316; G06Q 10/063114; G06Q 10/103; G06Q 10/0633; G06F 21/604
USPC ........................................................ 705/7.15
See application file for complete search history.

(56) References Cited

U.S. PATENT DOCUMENTS

| | | | | |
|---|---|---|---|---|
| 2009/0013082 A1* | 1/2009 | Nara | ...................... | G05B 15/02 709/228 |
| 2009/0048853 A1* | 2/2009 | Hall | ........................ | G06Q 10/20 705/305 |
| 2010/0124196 A1* | 5/2010 | Bonar | .................... | H04W 16/16 370/329 |

(Continued)

FOREIGN PATENT DOCUMENTS

| | | |
|---|---|---|
| JP | 2002123657 A | 4/2002 |
| JP | 2002-189513 A | 7/2002 |

(Continued)

*Primary Examiner* — Rutao Wu
*Assistant Examiner* — Tyrone E Singletary
(74) *Attorney, Agent, or Firm* — Osha Bergman Watanabe & Burton LLP

(57) ABSTRACT

An engineering support system that supports engineering of a process control system, the engineering support system includes: a server device that creates a work list including work order information that specifies a work order of work included in the process control system; and at least one client device that gives work authority to each worker based on the work list issued by the server device and that enables work on devices included in the process control system within a scope of given work authority to be implemented in the work order.

14 Claims, 11 Drawing Sheets

(56) References Cited

U.S. PATENT DOCUMENTS

| | | | | |
|---|---|---|---|---|
| 2014/0067089 A1* | 3/2014 | Kanbe | ............. | G05B 19/41845 |
| | | | | 700/73 |
| 2014/0172482 A1* | 6/2014 | Mitchell | ................ | G05B 15/02 |
| | | | | 705/7.15 |
| 2014/0228976 A1* | 8/2014 | K. S. | ..................... | G06F 21/604 |
| | | | | 700/9 |
| 2015/0106144 A1* | 4/2015 | Mangerson | .... | G06Q 10/063114 |
| | | | | 705/7.15 |
| 2016/0147955 A1* | 5/2016 | Shah | ...................... | G16H 40/20 |
| | | | | 705/2 |

FOREIGN PATENT DOCUMENTS

| | | | | |
|---|---|---|---|---|
| JP | 2002189513 A | * | 7/2002 | |
| JP | 2008123366 A | | 5/2008 | |
| JP | 2014-157444 A | | 8/2014 | |
| JP | 2014-199637 A | | 10/2014 | |
| JP | 5652444 B2 | | 1/2015 | |
| JP | 2018097771 A | * | 6/2018 | ............. G06F 21/30 |
| JP | 2018165919 A | * | 10/2018 | ......... G05B 19/4188 |

* cited by examiner

| I/O TAG | P&ID TAG | I/O TYPE | COMMUNI-CATION METHOD | DEVICE ADDRESS | DEVICE MODEL NAME | CHANNEL INFOR-MATION | I/O CHANNEL TEST RESULT | FIELD DEVICE TEST RESULT | ..... | I/O PROTECTION |
|---|---|---|---|---|---|---|---|---|---|---|
| I/O-1 | TI100 | AI | 4-20mA | 00:AA:BB:CC | AB123 | 1-1 | OK | OK | ..... | ☑ |
| I/O-2 | FI200 | AI | HART | 01:02:03:04 | CD456 | 2-3 | OK | NG | ..... | ☐ |
| I/O-3 | FO300 | DO | FF | 01:02:05:06 | EF789 | 2-4 | NG | None | ..... | ☐ |

| I/O TAG | P&ID TAG | DEVICE TYPE | I/O TYPE | RANGE | ENGINEER-ING UNIT | ..... |
|---|---|---|---|---|---|---|
| I/O-A | TI100 | TEMPERA-TURE MEA-SUREMENT | AI | 0-100 | °C | ..... |
| I/O-B | FI200 | FLOW RATE MEASURE-MENT | AI | 100-200 | PSI | ..... |
| I/O-C | FO300 | FLOW RATE ADJUST-MENT | DO | 100-200 | PSI | ..... |

| ROLE | I/O TAG | P&ID TAG | I/O TYPE | COMMUNI-CATION METHOD | DEVICE ADDRESS | DEVICE MODEL NAME | CHANNEL INFOR-MATION | I/O CHANNEL TEST RESULT | FIELD DEVICE TEST RESULT | ... | I/O PRO-TECTION |
|---|---|---|---|---|---|---|---|---|---|---|---|
| SCOPE OF WORK | SYSTEM | SYSTEM | SYSTEM | FIELD | FIELD | FIELD | FIELD | FIELD | FIELD | ... | SYSTEM |
| SYSTEM ENGINEER | ☑ | ☑ | ☑ | ☑ | ☑ | ☑ | ☑ | ☑ | ☑ | ... | ☑ |
| FIELD ENGINEER | ☐ | ☐ | ☑ | ☑ | ☑ | ☑ | ☑ | ☑ | ☑ | ... | ☐ |
| TESTER | ☐ | ☐ | ☐ | ☐ | ☐ | ☐ | ☐ | ☐ | ☐ | ... | ☐ |

Q1 = ROLE / SCOPE OF WORK columns; ED = data field columns; L2 = table reference

ENGINEERING SUPPORT SYSTEM, ENGINEERING SUPPORT METHOD, CLIENT DEVICE, AND STORAGE MEDIUM

CROSS REFERENCE TO RELATED APPLICATIONS

The present application claims priority based on Japanese patent application 2017-164741, filed on Aug. 29, 2017 and includes herein by reference the content thereof.

TECHNICAL FIELD

The present invention relates to an engineering support system, an engineering support method, a client device, and a storage medium.

BACKGROUND

A process control system constructed in a plant and the like is generally constituted by field devices (measurement devices and operation devices) called a field device, and a controller for controlling these devices, and an operation monitoring terminal (Human Machine Interface (HMI)) which operates or monitors the field devices and the controller being connected via a communicator. In this process control system, the controller collects process values obtained by the field device (for example, measurement values of a pressure, a temperature, and a flow rate) and performs an operation to operate (control) the field device in accordance with the collected process values. Such operations are repeated under the monitoring of an operation monitoring terminal, and thereby advanced automatic operation of a plant and the like is realized.

The design, construction, and maintenance (engineering) of a process control system are generally performed by many workers. For example, the operation scheme of a process control system is designed by a plant engineer, and the specification of a process control system that realizes the designed operation scheme is created by a system engineer. The construction and maintenance of a process control system are performed by cooperation between an on-site engineer in charge of each of constituent elements constituting a process control system (a field device, a controller, an operation monitoring terminal, a network, various types of programs used in a process control system, and the like) and a system engineer.

Japanese Patent Publication No. 5652444 (hereinafter, referred to as "Patent Document 1") discloses an example of a technology which supports the maintenance of a process control system. Specifically, Patent Document 1 discloses a technology which supports the maintenance of a process control system by including a storage means for storing specification information indicating the specification of a process control system and an extraction means for extracting actual state information indicating the actual state of a process control system, comparing specification information stored in the storage means with actual state information extracted by the extraction means, and presenting a difference between the actual state and the specification of a process control system.

As described above, the engineering of a process control system is performed by many workers being involved. As the size of a process control system increases, the number of workers involved in the engineering of the process control system also increases. If the number of workers increases, various types of work are often performed in parallel. For example, when a process control system is constructed, setting work of an I/O module for connecting a plurality of field devices to a controller, setting work of a program used in the controller, and setting work of a program used in an operation monitoring terminal are performed in parallel. In this manner, various types of work are performed in parallel, and thereby it is possible to shorten the time required for the construction or maintenance of a process control system.

However, when various types of work are performed in parallel, there is a possibility that differences may occur in engineering quality due to skill differences between workers, or a possibility that waste due to duplicate work or erroneous setting due to work errors may occur. For example, it can be assumed that an item whose setting has been finished by the setting work of one worker may be subjected to setting work again by another worker. In this case, when the same value as a previously set value is set, unnecessary duplicate work has been performed, and, when a different value from a previously set value has been set, erroneous setting due to a work error has been performed.

In recent years, process control systems have come to have closer coordination between constituent elements due to digitization, intelligence rendering, and the like. If even a part of a process control system is a part with low engineering quality or a part subjected to erroneous setting due to a work error, there is a possibility that the entire process control system may be adversely affected. For this reason, when the construction or maintenance of a process control system is performed, it is extremely important to ensure engineering quality and to reduce work errors.

SUMMARY

One or more embodiments of the present invention provide an engineering support system, an engineering support method, a client device, and a storage medium which can reduce work errors while ensuring engineering quality.

An engineering support system which supports engineering of a process control system according to one or more embodiments of the present invention may include a server device configured to issue a work list including work order information that specifies a work order of work included in the engineering the process control system, and at least one client device configured to give a work authority to each worker on the basis of the work list issued by the server device and to enable work on devices included in the process control system within a scope of given work authority to be implemented in the work order specified in the work order information.

In the above-described engineering support system, the client device may be configured to transmit the work list including work progress information indicating that work enabled to be implemented has been implemented to (i.e., has been implemented on) the server device. The server device may be configured to set protection information for preventing implemented work from being implemented again on the basis of the work progress information.

In the above-described engineering support system, the client device may be configured to transmit the work list including work progress information indicating that work enabled to be implemented has been implemented to another (a second) client device. The client device may be configured to refer to the work progress information included in the work list transmitted from the another client device and to enable the work on the devices included in the process control system to be implemented.

In the above-described engineering support system, the client device may be configured to transmit a part of the work list including the work progress information to the server device.

In the above-described engineering support system, the client device may be configured to transmit a part of the work list including the work progress information to the another client device.

In the above-described engineering support system, the work list may include a first list that specifies the work included in the engineering the process control system, a second list that specifies information on authority in accordance with a role of each worker, a third list that specifies information indicating the role of each worker, and a fourth list that includes the work order information.

In the above-described engineering support system, the client device may be configured to transmit the work list to another client device when all of work included in the work order information is not completed, and to transmit the work list to the server device when all of work included in the work order information is completed.

In the above-described engineering support system, the client device may be configured to add work progress information indicating a completion of work to the work list whenever the work included in the work order information is completed.

In the above-described engineering support system, the client device may be configured to add work progress information indicating a completion of work to the fourth list whenever the work included in the work order information is completed.

In the above-described engineering support system, the client device may be configured to transmit the work list including work progress information indicating that work enabled to be implemented has been implemented to the server device. The server device may be configured to change a second list that specifies information on authority in accordance with a role of each worker included in the work list.

In the above-described engineering support system, the at least one client device may include a first client device, a second client device, and a third client device. The first client device may be configured to transmit the work list including work progress information indicating that work enabled to be implemented has been implemented to the second client device. The second client device may be configured to refer to the work progress information included in the work list transmitted from the first client device and to enable the work on the devices included in the process control system to be implemented. The second client device may be configured to transmit the work list including work progress information indicating that work enabled to be implemented has been implemented to the third client device. The third client device may be configured to refer to the work progress information included in the work list transmitted from the second client device and to enable the work on the devices included in the process control system to be implemented.

In the above-described engineering support system, the at least one client device may include a first client device, a second client device, and a third client device. The first client device may be configured to transmit the work list including work progress information indicating that work enabled to be implemented has been implemented to the second client device and the third client device. Each of the second client device and the third client device may be configured to refer to the work progress information included in the work list transmitted from the first client device and to enable the work on the devices included in the process control system to be implemented.

An engineering support method which supports engineering of a process control system according to one or more embodiments of the present invention may include issuing a work list including work order information that specifies a work order of work included in the engineering the process control system, giving a work authority to each worker on the basis of the issued work list, and enabling work on devices included in the process control system in a scope of given work authority to be implemented in the work order specified in the work order information.

A client device which is used for implementation of work included in engineering a process control system according to one or more embodiments of the present invention may include an authenticator configured to perform authentication of workers using the client device, an authorizer configured to give a work authority for work to be implemented to a worker authenticated by the authenticator on the basis of a work list including information on work included in the engineering the process control system, and a work implementer configured to enable work for which work authority is given by the authorizer to be implemented in a work order specified in work order information included in the work list.

The above-described client device may further include a list updater configured to update the work list to include work progress information indicating that work enabled to be implemented has been implemented.

The above-described client device may further include a transmitter and receiver configured to transmit or receive the work list.

In the above-described client device, the transmitter and receiver may be configured to transmit the work list including work progress information indicating that work enabled to be implemented has been implemented to another client device. The work implementer may be configured to refer to the work progress information included in the work list transmitted from the another client device and to enable the work to be implemented.

In the above-described client device, the work list may include a first list that specifies the work included in the engineering the process control system, a second list that specifies information on authority in accordance with a role of each worker, a third list that specifies information indicating the role of each worker, and a fourth list that includes the work order information.

In the above-described client device, the list updater may be configured to add work progress information indicating a completion of work to the fourth list whenever the work included in the work order information is completed.

A non-transitory computer-readable storage medium according to one or more embodiments of the present invention may store a client program, which when executed by a computer, causes the computer to perform authentication of workers, give a work authority for work to be implemented to (i.e., for work to be applied to) a worker authenticated on the basis of a work list including information on work included in engineering of a process control system, and enable work for which work authority is given to be implemented in a work order specified in work order information included in the work list.

According to one or more embodiments of the present invention, a work list including work order information that specifies a work order of work required for engineering a process control system is issued, a work authority is given to each worker on the basis of the issued work list, and work on constituent devices constituting the process control system within a scope of the given work authority is enabled to be implemented in a work order specified in the work order information, and thus it is possible to reduce work errors while ensuring engineering quality.

BRIEF DESCRIPTION OF THE DRAWINGS

FIGS. 4A and 4B are diagrams which show an example of a work instruction list used in one or more embodiments of the present invention.

FIG. 5 is a diagram which shows an example of a work authority list used in one or more embodiments of the present invention.

DETAILED DESCRIPTION

Hereinafter, an engineering support system, an engineering support method, a client device, and a storage medium according to one or more embodiments of the present invention will be described in detail with reference to drawings. In the following, a process control system which is an object to support engineering will be described first, and an engineering support system which supports engineering for the process control system will then be described.
[Process Control System]

Figure 1:
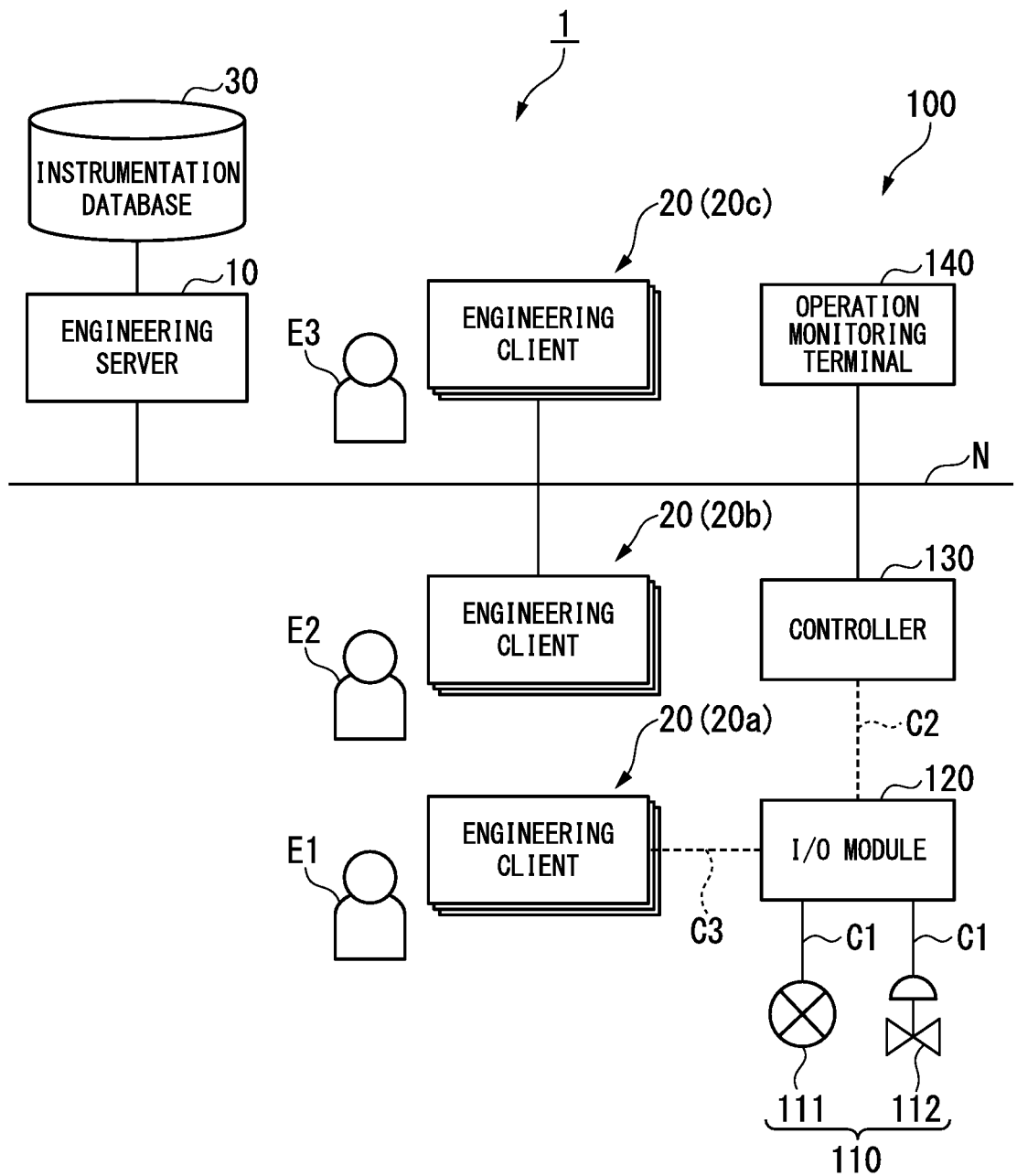
FIG. 1 is a block diagram which shows a configuration of a main part of an engineering support system and a process control system according to one or more embodiments of the present invention.

FIG. 1 is a block diagram which shows a configuration of a main part of an engineering support system and a process control system according to one or more embodiments of the present invention. As shown in FIG. 1, a process control system 100 includes a field device 110, an input/output (I/O) module 120, a controller 130, and an operation monitoring terminal 140. In the process control system 100, the controller 130 controls the field device 110 in accordance with an instruction and the like from the operation monitoring terminal 140, and thereby the control of an industrial process realized in a plant (not shown) is performed. The process control system 100 is constructed or is maintained while being supported by an engineering support system 1 to be described below.

The field device 110 and the I/O module 120 are connected by a transmission line C1, and the I/O module 120 and the controller 130 are connected by a cable C2. At the time of construction of the process control system 100, various types of settings are made for each of the I/O module 120 and the controller 130 in a state in which the I/O module 120 and the controller 130 are not connected by the cable C2. For this reason, the cable C2 is indicated by a broken line in FIG. 1. The controller 130 and the operation monitoring terminal 140 are connected to a control network N. The control network N is a network which connects, for example, a plant site and a monitoring room.

The field device 110 is, for example, a sensor device such as a flow meter or a temperature sensor, a valve device such as a flow rate control valve or an opening/closing valve, an actuator device such as a fan or a motor, and other devices installed in a plant site. In one or more embodiments, a case in which a state quantity in the industrial process to be controlled is a flow rate of fluid will be described as an example for ease of understanding. For this reason, one sensor device 111 for measuring the flow rate of fluid and one valve device 112 for controlling (operating) the flow rate of fluid among a plurality of field devices 110 installed in a plant are shown in FIG. 1.

The I/O module 120 is provided between the field device 110 and the controller 130. The I/O module 120 includes a plurality of I/O channels (not shown) to which the field device 110 is connected. The I/O module 120 performs processing of signals input or output between the field device 110 and the controller 130 connected to each I/O channel. For example, processing of converting a signal obtained from the field device 110 into a signal which can be received by the controller 130 is performed. It may be said that this I/O module 120 is a module which connects the plurality of field devices 110 to the controller 130, and performs a relay between a signal input and output by the field device 110 and a signal input and output by the controller 130.

The controller 130 controls the field device 110 by communicating with the field device 110 in accordance with an instruction and the like from the operation monitoring terminal 140. For example, the controller 130 acquires a process value measured by a certain field device 110 (for example, the sensor device 111), and calculates an operation amount of another field device 110 (for example, the valve device 112) and transmits it, thereby controlling another field device 110 (for example, the valve device 112).

The operation monitoring terminal 140 is, for example, a terminal operated by an operation of a plant and used for monitoring a process. For example, the operation monitoring terminal 140 notifies an operator of a behavior of the field device 110 and the controller 130 constituting the process control system 100 by acquiring input/output data of the field device 110 from the controller 130. The operation monitoring terminal 140 controls the controller 130 on the basis of an instruction of the operator.
[Engineering Support System]

The engineering support system 1 includes an engineering server 10 (a server device), an engineering client 20 (a client device), and an instrumentation database 30 as shown in FIG. 1. The engineering support system 1 supports engineering of the process control system 100 described above.

The engineering server 10 is connected to the control network N. The engineering server 10 creates a work list including information on work required for engineering the process control system 100. For example, the engineering server 10 creates the work list described above using design information stored in the instrumentation database 30 on the basis of an instruction of a system engineer or a project manager.

Figure 2:
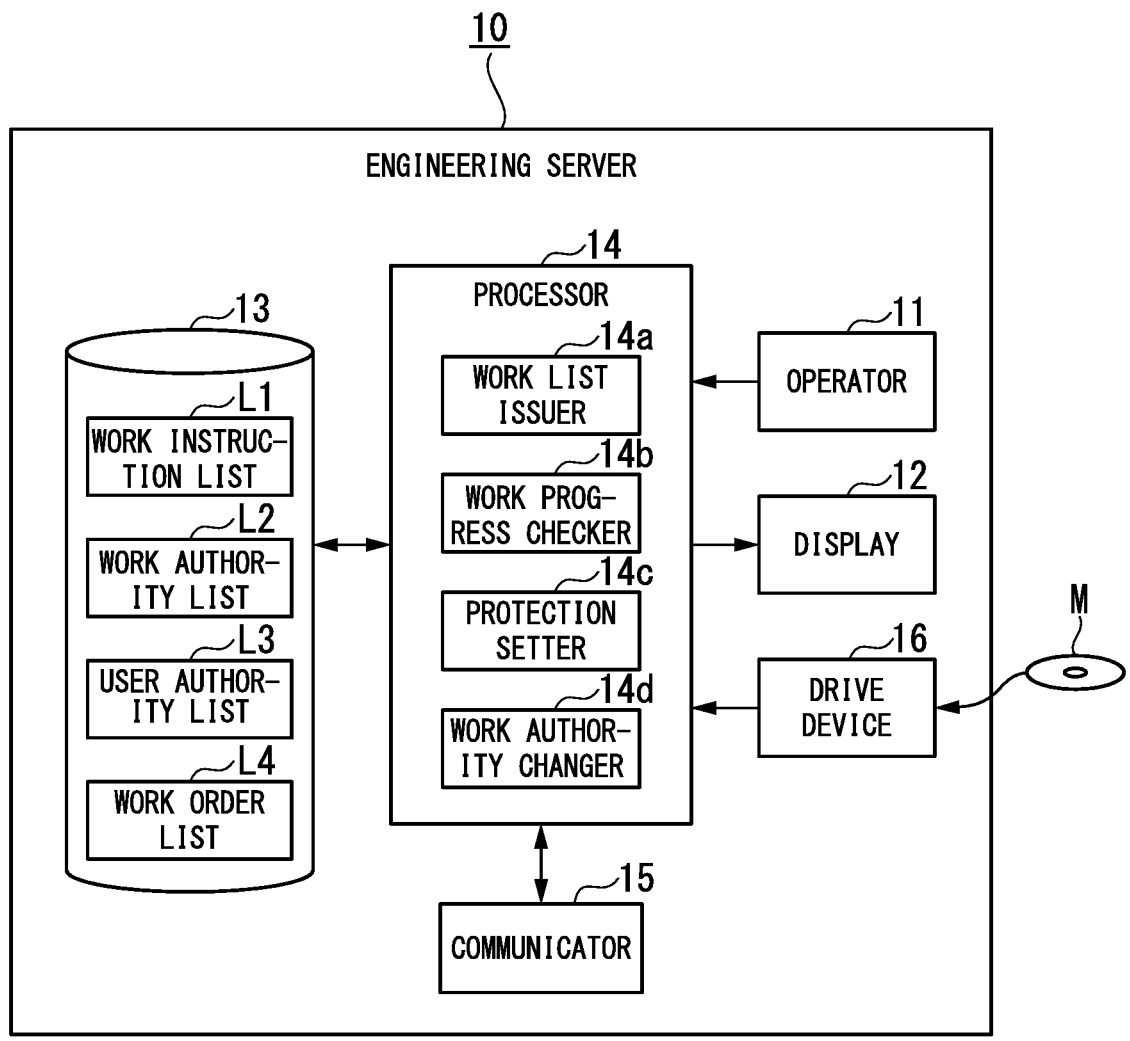
FIG. 2 is a block diagram which shows a configuration of a main part of an engineering server.

The work list created by the engineering server 10 includes a work instruction list L1 (a first list), a work authority list L2 (a second list), a user authority list L3 (a third list), and a work order list L4 (a fourth list) as shown in FIG. 2. The engineering server 10 duplicates (copies) the created work list and transmits (issues) it to the engineering client 20. As disclosed in Patent Document 1, the work list may be automatically created.

The work instruction list L1 is a list which specifies work required for engineering the process control system 100. The work authority list L2 is a list which specifies information on authority in accordance with a role of workers who engineer the process control system 100. The user authority list L3 is a list which specifies information indicating the role of each worker. The work order list L4 is a list which specifies a work order of work required for engineering the process control system 100. The work instruction list L1, the work authority list L2, the user authority list L3, and the work order list L4 will be described in detail as follows.

The role of workers described above means a so-called job type of a worker (or a skill of a worker), and includes, for example, a system engineer, a field engineer, and a tester. The system engineer is, for example, an engineer who instructs design, construction, testing, or the like of the process control system 100. The field engineer is, for example, an engineer who works in a plant site. The tester is, for example, an engineer who performs various types of test in a plant site. That is, it is possible to ascertain equipment or devices to be worked with for each worker on the basis of the role of workers.

The engineering server 10 acquires the work order list L4 (the work order list L4 updated to include work progress information indicating that work has been implemented) updated by the engineering client 20, and confirms a progress status of work. The engineering server 10 sets a protection flag (protection information) for implemented work among pieces of work specified in the work instruction list L1 on the basis of content of the acquired work order list L4. This protection flag is for preventing editing of the implemented work among pieces of work specified in the work instruction list L1, and is for preventing erroneous editing and duplicate work.

The engineering client 20 is a terminal device for implementing work on constituent devices constituting the process control system 100 on the basis of the work lists (the work instruction list L1, the work authority list L2, the user authority list L3, and the work order list L4) issued by the engineering server 10. The constituent devices constituting the process control system 100 include the field device 110, the I/O module 120, the controller 130, the operation monitoring terminal 140, and the like, shown in FIG. 1.

The engineering client 20 performs authentication on workers using the engineering client 20. Then, the engineering client 20 gives a work authority to work which an authenticated worker can perform using the engineering client 20 on the basis of the work instruction list L1, the work authority list L2, the user authority list L3, and the work order list L4 described above, and can implement the work to which work authority is given in a pre-defined work order.

The engineering client 20 gives the work authority described above to work to reduce work errors while ensuring an engineering quality. The engineering client 20 can implement the work given the work authority in a work order specified in advance to reduce work errors while ensuring an engineering quality even when the work is performed in parallel by a plurality of workers.

The engineering client 20 updates the work order list L4 to include work progress information indicating a progress status of work performed in accordance with an instruction of workers. Then, the engineering client 20 transmits the updated work order list L4 to the engineering server 10 or another engineering client 20. The updated work order list L4 may also be transmitted along with the work instruction list L1, the work authority list L2, and the user authority list L3. That is, a part of a work list including the work progress information may be transmitted or an entire work list including the work progress information may also be transmitted.

The engineering client 20 transmits the updated work order list L4 and the like to another engineering client 20 to notify another engineering client of the progress status of work in the engineering client 20 itself. That is, the engineering clients 20 transmit and receive the updated work order list L4 and the like to and from each other (exchange with each other), and by referring to these thereby ascertain the progress status of work in a client itself and the progress status of work in other clients in one or more embodiments. As a result, for example, even when a work order of work required to be performed by the client itself is set next to a work order of work performed in another client, the work of the client itself can be promptly started after the work of another client is completed.

An engineering client 20a used by a field system engineer E1, an engineering client 20b used by a control system engineer E2, and an engineering client 20c used by an HMI system engineer E3 are shown as the engineering clients 20 for ease of understanding in FIG. 1. In the following, when these engineering clients 20a to 20c are distinguished, they are referred to as "engineering clients 20a to 20c," and when the engineering clients 20a to 20c are not distinguished, these are collectively referred to as the "engineering client 20."

The field system engineer E1 described above is, for example, an engineer who performs setting work and the like of the field device 110 or the I/O module 120 in a plant site. The control system engineer E2 described above is, for example, an engineer who performs setting work and the like of the controller 130. The HMI system engineer E3 described above is, for example, an engineer who performs setting work and the like of the operation monitoring terminal 140. For this reason, the engineering client 20a is used for the setting work and the like of the field device 110 or the I/O module 120. The engineering client 20b is used for the setting work and the like of the controller 130. The engineering client 20c is used for the setting work and the like of the operation monitoring terminal 140. A work list sent from the engineering server 10 to each of the engineering clients 20a to 20c may be the same.

In the example shown in FIG. 1, the engineering clients 20b and 20c are connected to the control network N, and the engineering client 20a is not connected to the control network N. If the work list described above can be exchanged with the engineering server 10 and between the engineering clients 20, the engineering clients 20 do not necessarily have to be connected to the control network N.

In the example shown in FIG. 1, the engineering client 20a is connected to the I/O module 120 via a cable C3. The engineering client 20a is connected to the I/O module 120 at the time of, for example, construction of the process control system 100, but is disconnected from the I/O module 120 if construction and the like of the process control system 100 are completed. For this reason, the cable C3 is indicated by a broken line in FIG. 1. Details of the engineering client 20 will be described below.

The instrumentation database 30 stores the above design information referred to by the engineering server 10. This design information is, for example, information which specifies a specification of the field device 110 constituting the process control system 100, a specification of the controller 130, a screen setting of the operation monitoring terminal 140, and the like, and is created by a system engineer.

[Engineering Server]

FIG. 2 is a block diagram which shows a configuration of a main part of the engineering server. As shown in FIG. 2, the engineering server 10 includes an operator 11, a display 12, a storage 13, a processor 14, a communicator 15, and a drive device 16. Such an engineering server 10 is realized by, for example, a personal computer or a work station.

The operator 11 includes an input device such as a keyboard or a pointing device. The operator 11 outputs an instruction (an instruction with respect to the engineering server 10) in accordance with an operation of workers using the engineering server 10 to the processor 14. The display 12 includes a display device such as a liquid crystal display device, and displays various types of information output from the processor 14. The operator 11 and the display 12 may be physically separated, or may be physically integrated as a touch panel type liquid crystal display device having both a display function and an operation function.

The storage 13 includes an auxiliary storage device such as a hard disk drive (HDD) or a solid state drive (SSD), and stores various types of data. For example, the storage 13 stores the work lists (the work instruction list L1, the work authority list L2, the user authority list L3, and the work order list L4) created by the engineering server 10. The storage 13 also stores, for example, various programs executed by the engineering server 10.

The processor 14 collectively controls an operation of the engineering server 10 on the basis of an operation instruction input from the operator 11 or an instruction transmitted via the control network N. This processor 14 includes a work list issuer 14a, a work progress checker 14b, a protection setter 14c, and a work authority changer 14d. The work list issuer 14a creates and issues the work lists (the work instruction list L1, the work authority list L2, the user authority list L3, and the work order list L4) using the design information stored in the instrumentation database 30 on the basis of an operation with respect to the operator 11.

The work progress checker 14b acquires the work order list L4 (the work order list L4 updated to include work progress information indicating work has been implemented) transmitted from the engineering client 20, and confirms the progress status of work by referring to the acquired work order list L4. The protection setter 14c sets the protection flag described above for implemented work among pieces of work specified by the work instruction list L1 on the basis of the content of the work order list L4 acquired by the work progress checker 14b.

The work authority changer 14d changes a work authority when a work authority needs to be changed in accordance with the progress status of work. Cases in which such a change is required, for example, include a case in which a work authority is changed to higher (higher skill) workers when a problem occurs in work, and the like. It should be noted that such a change of work authority is a change in work which can be implemented by workers, and a content of the work authority list L2 is not changed.

The communicator 15 is controlled by the processor 14, and performs communication via the control network N. In the example shown in FIG. 1, for example, the engineering client 20a may be directly connected to the engineering server 10. A detachable electronic medium (not shown) such as a universal serial bus (USB) memory may be attached to the engineering server 10 in some cases. In such a case, the communicator 15 performs communication with the engineering client 20a or the USB memory which is directly connected. The communicator 15 may perform wired communication or may perform wireless communication.

The drive device 16 reads data recorded on a computer readable recording medium such as a CD-ROM or DVD (registered trademark)-ROM. This recording medium M stores a program which realizes functions of respective blocks of the engineering server 10 (for example, functions of the work list issuer 14a to the work authority changer 14d provided in the processor 14).

The program stored in such a recording medium M is read by the drive device 16 and installed in the engineering server 10, and thereby the functions of respective blocks of the engineering server 10 are realized in software. In other words, these functions are realized by cooperation between software and hardware resources. The program which realizes functions of respective blocks of the engineering server 10 may be distributed in a state recorded in the recording medium M, and may also be distributed via an external network such as the Internet.

[Engineering Client]

Figure 3:
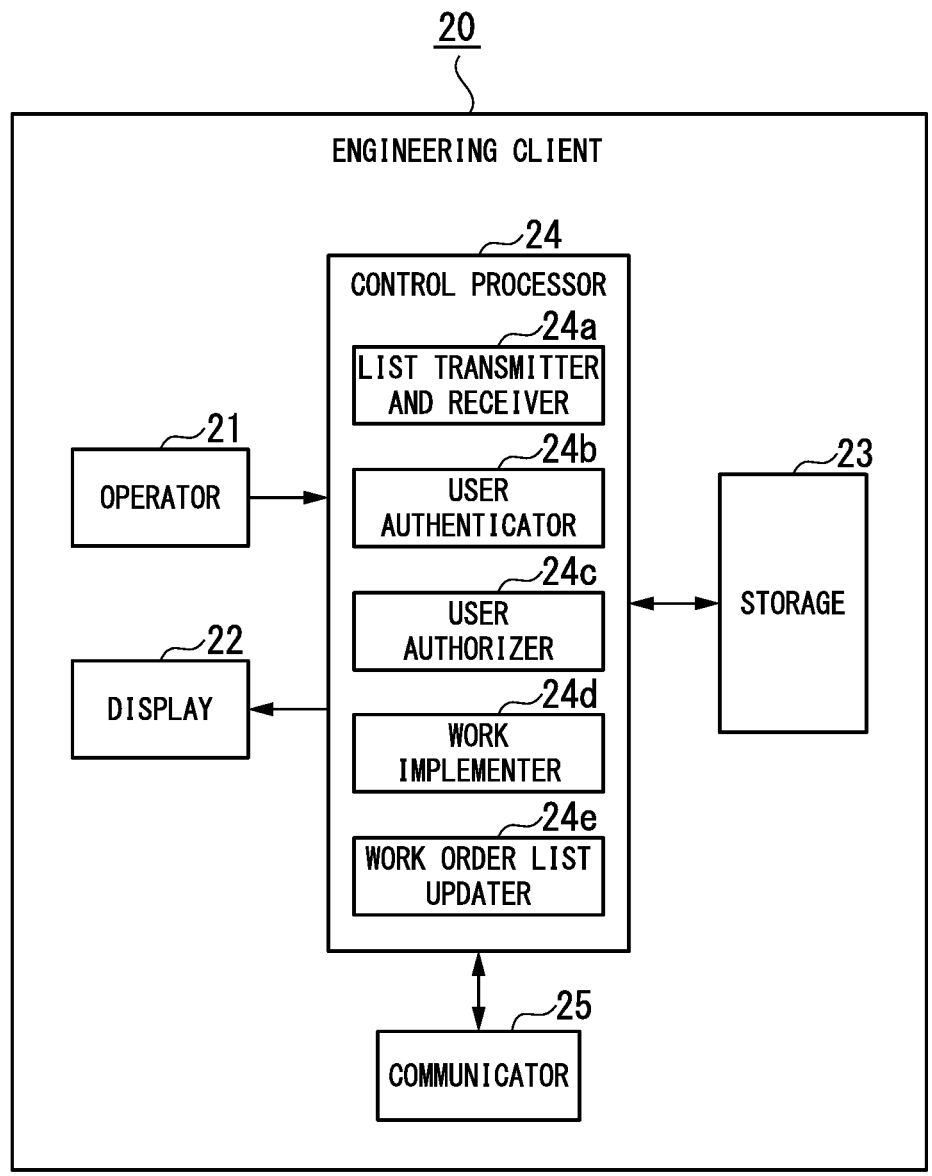
FIG. 3 is a block diagram which shows a configuration of a main part of an engineering client.

FIG. 3 is a block diagram which shows a configuration of a main part of the engineering client. As shown in FIG. 3, the engineering client 20 includes an operator 21, a display 22, a storage 23, a control processor 24, and a communicator 25. Such an engineering client 20 is realized by, for example, a desktop type, notebook type, or tablet type personal computer.

The operator 21 and the display 22 are the same as the operator 11 and the display 12 shown in FIG. 2. The operator 21 and the display 22 may be physically separated like the operator 11 and the display 12 shown in FIG. 2, and may also be physically integrated as a touch panel type liquid crystal display device having both a display function and an operation function. The storage 23 includes, for example, a volatile memory or a non-volatile memory, and stores various types of data used in the engineering client 20.

The control processor 24 collectively controls an operation of the engineering client 20. The control processor 24 performs processing required for performing various settings of the field device 110, the I/O module 120, the controller 130, the operation monitoring terminal 140, and the like constituting the process control system 100. This control processor 24 includes a list transmitter and receiver 24a (a transmitter and receiver), a user authenticator 24b (an authenticator, an authentication device), a user authorizer 24c (an authorizer, an authority giving device), a work implementer 24d (a work implementation device), and a work order list updater 24e (a list updater).

The list transmitter and receiver 24a receives the work lists issued by the engineering server 10 (the work instruction list L1, the work authority list L2, the user authority list L3, and the work order list L4). The list transmitter and receiver 24a receives the work instruction list L1 and the work order list L4 transmitted from another engineering client 20.

The list transmitter and receiver 24a transmits the work order list L4 updated by the work order list updater 24e to the engineering server 10 or another engineering client 20. For example, the list transmitter and receiver 24a transmits the work order list L4 and the like to another engineering client 20 when all of work whose work order is specified in the work order list L4 is not completed, and transmits the work order list L4 and the like to the engineering server 10 when all of work whose work order is specified in the work order list L4 is completed. The list transmitter and receiver 24a may transmit the work order list L4 and the like to both the engineering server 10 and another engineering client 20.

The user authenticator 24b performs authentication of workers who use the engineering client 20. For example, the user authenticator 24b performs authentication of workers who use the engineering client 20 by collating a user ID and a password for authentication input from the operator 21 with a user ID and a password for authentication held in advance.

The user authorizer 24c gives a work authority to work to be implemented to a worker authenticated by the user authenticator 24b (work which a worker authenticated by the user authenticator 24b can perform using the engineering client 20) among pieces of work specified in the work instruction list L1 on the basis of the work authority list L2 and the user authority list L3 received by the list transmitter and receiver 24a. "Giving of work authority" does not mean giving work qualifications to workers, but to assign work that can be implemented to workers. Details of giving of a specific work authority which is performed by the user authorizer 24c will be described.

The work implementer 24d can implement work given work authority by the user authorizer 24c in a work order specified in the work order list L4. For example, the work implementer 24d of the engineering client 20a can implement setting work and the like of the field device 110 or the I/O module 120 in the work order specified in the work order list L4. The work implementer 24d of the engineering client 20b can implement setting work and the like of the controller 130 in the work order specified in the work order list L4. The work implementer 24d of the engineering client 20c can implement setting work and the like of the operation monitoring terminal 140 in the work order specified in the work order list L4.

The work order list updater 24e updates the work order list L4. For example, the work order list L4 is updated to include work progress information indicating that work enabled to be implemented has been implemented. Since the information indicating that work has been implemented is added whenever work enabled to be implemented is implemented by the work implementer 24d, the work order list L4 is updated whenever work enabled to be implemented is implemented by the work implementer 24d.

The communicator 25 communicates with external devices. For example, when the engineering client 20a shown in FIG. 1 is directly connected to the engineering server 10, the communicator 25 provided in the engineering client 20a communicates with the engineering server 10 via the control network N. The communicators 25 provided in the engineering clients 20b and 20c shown in FIG. 1 communicate with the engineering server 10 via the control network N. When a detachable electronic medium (not shown) such as a USB memory is mounted on the engineering client 20, the communicator 25 communicates with the USB memory. The communicator 25 may perform wired communication or may perform wireless communication.

Each block provided in the control processor 24 described above (the list transmitter and receiver 24a, the user authenticator 24b, the user authorizer 24c, the work implementer 24d, and the work order list updater 24e) is realized by a program for realizing each function being executed by a central processing unit (CPU). That is, each block provided in the control processor 24 is realized by cooperation between software and hardware resources.

The program which realizes the functions described above is distributed in a state of being recorded in a computer readable recording medium such as a CD-ROM or a DVD (registered trademark)-ROM, or is distributed via an external network such as the Internet. Various functions described above provided in the control processor 24 of the engineering client 20 are realized in software by reading and installing a program recorded in a recording medium or by installing a program downloaded via an external network.

<Work Instruction List>

FIGS. 4A and 4B are diagrams which show an example of a work instruction list used in one or more embodiments of the present invention. The work instruction list L1 includes a work instruction list L11 shown in FIG. 4A and a work instruction list L12 shown in FIG. 4B. The work instruction list L11 shown in FIG. 4A is a list which specifies a work instruction for the I/O module 120, and the work instruction list L12 shown in FIG. 4B is a list which specifies a work instruction for the controller 130. The work instruction list L1 is issued by the engineering server 10 and used in the engineering client 20 as described above.

As shown in FIG. 4A, the work instruction list L11 is a list in which input/output information J1 and I/O protection information PR (protection information) are correlated with an I/O tag T1 set in each of I/O channels (not shown) of the I/O module 120. The input/output information J1 is information on an input/output and the like of the field device 110 connected to each of the I/O channels. In the example shown in FIG. 4A, items of the input/output information J1 includes "P&ID tag," "I/O type," "communication method," "device address," "device model name," "channel information," "I/O channel test result," "field device test result," and the like.

"P&ID tag" is a tag used to logically indicate each of the I/O channels provided in the I/O module 120 in a piping and instrumentation diagram (P&ID). "I/O type" is information indicating a type of the input/output of the field device 110 (an input of an analog signal (AI), an output of an analog signal (AO), an input of a digital signal (DI), an output of a digital signal (DO), and the like).

"Communication method" is information indicating a communication method used in the field device 110. In the example shown in FIG. 4A, a communication method using 4 to 20 mA signals, a communication method conforming to HART (registered trademark), and a communication method conforming to Foundation Fieldbus (FF: registered trademark) may be exemplified. "Device address" is information indicating an address assigned to the field device 110. "Device model name" is information indicating a format (model name) of the field device 110. "Channel information" is information indicating a communication channel used in the field device 110.

"I/O channel test result" is a test result of a test (for example, a confirmation test of a state) performed on each of the I/O channels. "Field device test result" is a test result of a test (for example, a confirmation test of a state) performed on the field device 110 connected to each of the I/O channels. In the example shown in FIG. 4A, the I/O channel test result and the field device test result include "OK" indicating acceptance, "NG" indicating non-acceptance, and "None" indicating there is no test result.

The I/O protection information PR specifies whether modification (editing) of the input/output information J1 correlated to the I/O tag T1 is permitted. Since this I/O protection information PR specifies whether modification of "I/O channel test result" and "field device test result" included in the input/output information J1 is permitted, the I/O protection information PR specifies whether a test can be implemented on an I/O channel in which the I/O tag T1 is set. That is, the I/O protection information PR is for specifying whether to protect a state of an I/O channel.

In the example shown in FIG. 4A, the I/O protection information PR includes presence or absence of an I/O protection flag ("check box with a check" and "check box without a check"). When there is an I/O protection flag (in the case of "check box with a check"), it is indicated that the state of an I/O channel is protected, and when there is no I/O protection flag (in the case of "check box without a check"), it is indicated that the state of an I/O channel is not protected. In the case in which the work instruction list L11 is displayed by the engineering server 10 or the engineering client 20, as shown in FIG. 4A, a line having the I/O protection flag has, for example, a grayed out state in which modification of content is not permitted unless there is an authority. A person who has an authority for being able to perform setting (modification) of the I/O protection flag is, for example, a system engineer.

As shown in FIG. 4B, the work instruction list L12 is a list in which a tag T2 used in the controller 130 and the input/output information J2 in an I/O channel are correlated to each other to logically identify each of the I/O channels of the I/O module 120. In an example shown in FIG. 4B, items of the input/output information J2 in an I/O channel includes "P & ID tag," "device type," "I/O type," "range," "engineering unit," and the like. The work instruction list L12 may be a list in which an item of the I/O protection information is provided, and may be a list integrated with the work instruction list L11. Moreover, the input/output information J2 cannot be modified by a field engineer or tester (a worker whose scope of work is assigned to a field side to be described below) regardless of the presence or absence of a check of the I/O protection information.

"P & ID tag" and "I/O type" are the same as those included in the input/output information J1 of the work instruction list L11. "Device type" is information indicating a function of the field device 110 connected to an I/O channel. In the example shown in FIG. 4B, temperature measurement, flow rate measurement, flow rate adjustment, and the like are exemplified. "Range" is information indicating a range of the magnitude of a signal input and output by an I/O channel. "Engineering unit" is information indicating a unit for the signal input and output by an I/O channel. For example, when the signal input and output by an I/O channel is a signal indicating temperature, "° C." is specified as an "engineering unit."

<Work Authority List>

FIG. 5 is a diagram which shows an example of a work authority list used in one or more embodiments of the present invention. The work authority list L2 is also issued by the engineering server 10 and used in the engineering client 20 as described above. The work authority list L2 is used for limiting a range in which work specified in the work instruction list L1 can be implemented in units of the items of the work instruction list L1 (I/O tag T1, each item of the input/output information J1, and the I/O protection information PR) in accordance with the role of workers. In other words, the work authority list L2 is used to give an authority for being able to implement work specified in the work instruction list L1 in units of the items described above of the work instruction list L1 in accordance with the role of workers.

As shown in FIG. 5, the work authority list L2 is a list in which availability information ED that specifies whether modification of each item of the work instruction list L1 is permitted is correlated with a role Q1 of workers. In an example shown in FIG. 5, the role Q1 of workers includes "system engineer," "field engineer," and "tester." In the example shown in FIG. 5, the availability information ED includes presence or absence of an authorization flag for each combination of the role Q1 of workers and the items of the work instruction list L1 ("check box with a check" and "check box without a check"). In the role of workers, "field engineer", roles are subdivided for each facility to be taken charge of such as a sensor, a valve, or a transmitter, and authority can be set for each role subdivision. In the same manner, for example, roles may also be subdivided for each facility to be taken charge of in the roles of workers, "system engineer" and "tester."

When there is an authorization flag (in the case of "check box with a check"), it is indicated that modification of items in the corresponding column is permitted for the role of workers in the corresponding row. On the other hand, when there is no authorization flag (in the case of "check box without a check"), it is indicated that the modification of items in the corresponding column is not permitted for the role of workers in the corresponding row. However, even when there is an authorization flag, if an item is not included in a scope of work specified in advance (information that specifies in which roles of workers work on each item of the work instruction list L1 is shared), modification is not permitted. The purpose of using such a scope of work is to strictly limit a range in which work specified in the work instruction list L1 can be implemented in accordance with the role of workers.

In the example shown in FIG. 5, the scope of work includes "system" and "field" set for each item of the work instruction list L1. In this scope of work, a person who has control over a whole project (for example, a project leader) or a person with modification authority (for example, a system engineer and the like) can modify the settings. "System" indicates that there is an item whose modification is permitted by a system engineer, and "field" indicates that there is an item whose modification is permitted by a field engineer and a tester.

For this reason, in the example shown in FIG. 5, since there is an authorization flag in a row of "system engineer" and in a column of "I/O protection", and a scope of work of "I/O protection" is "system", "system engineer" can modify "I/O protection." On the other hand, in the example shown in FIG. 5, there is an authorization flag in the row of "field engineer" and in a column of "I/O type", but a scope of work of "I/O type" is "system" and is not included in a scope of work of "field engineer," and thus "field engineer" cannot modify "I/O type." In the example shown in FIG. 5, there is no authorization flag in a row of "tester", but this is because a tester does not have a modification authority for various settings and is only permitted to perform a test.

When the work authority list L2 is displayed by the engineering server 10 or the engineering client 20, as shown in FIG. 5, a range not included in a scope of work has, for example, a grayed out state. For example, when a scope of work is "system", corresponding boxes of "field engineer" and "tester" have grayed out states. On the other hand, when a scope of work is "field", a corresponding box of "system engineer" has a grayed out state. In the boxes in a grayed out state, modification (editing) cannot be performed regardless of the presence or absence of an authorization flag. For this reason, as described above, although there is an authorization flag in the row of "field engineer" and the column of "I/O type", the scope of work of "I/O type" is not included in the scope of work of "field engineer", and thus "field engineer" cannot modify "I/O type."

A display in accordance with the scope of work shown in FIG. 5 is performed, and thereby workers can immediately ascertain the scope of work of each worker. In the work authority list L2, for example, an authorization flag set in a range in a grayed out state is invalid, and thus even a user who has a modification authority for a role (a permission flag is set) in a portion in a grayed out state cannot perform modification (editing) in that portion.

<User Authority List>

Figure 6:
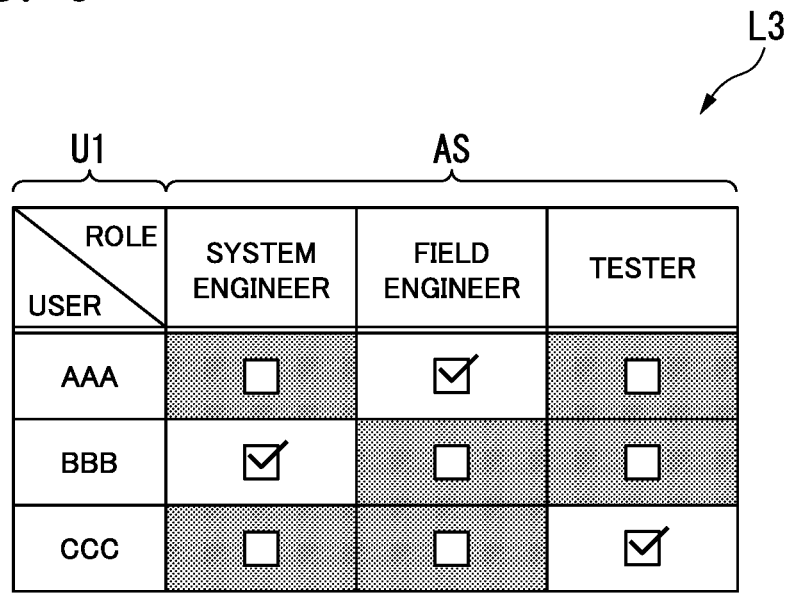
FIG. 6 is a diagram which shows an example of a user authority list used in one or more embodiments of the present invention.

FIG. 6 is a diagram which shows an example of a user authority list used in one or more embodiments of the present invention. The user authority list L3, in the same manner as the work authority list L2, is issued by the engineering server 10 and used in the engineering client 20. The user authority list L3 is used for setting a role for workers (users). This user authority list L3 is linked with the work authority list L2 by a role name.

As shown in FIG. 6, the user authority list L3 is a list in which assignment information AS which specifies a role to be set is correlated with a worker U1. In the example shown in FIG. 6, workers (users) U1 include "AAA," "BBB," and "CCC." The assignment information AS includes presence or absence of a flag ("check box with a check" and "check box without a check") for each combination of a worker (user) U1 and a role in the example shown in FIG. 6.

When there is a flag (in the case of "check box with a check"), it is indicated that a role of the corresponding column is assigned to a worker of the corresponding row. When there is no flag (in the case of "check box without a check"), it is indicated that a role of the corresponding column is not assigned to a worker of the corresponding row. When the user authority list L3 is displayed by the engineering server 10 or the engineering client 20, as shown in FIG. 6, a portion with no flag becomes, for example, the grayed out state. Such a display is performed, and thereby each worker can immediately ascertain a role assigned to itself.

As described above, since the user authority list L3 and the work authority list L2 are linked with each other by a role name, it is possible to set authority to modify the work instruction list L1 for every worker using the engineering client 20. For this reason, for example, a role of "field engineer" is assigned to a plurality of users in the user authority list L3, and thereby it is possible to perform appropriate setting even when a plurality of workers performs setting and test of the plurality of I/O modules 120 and the field device 110 using the plurality of engineering clients 20.

<Work Order List>

Figure 7:
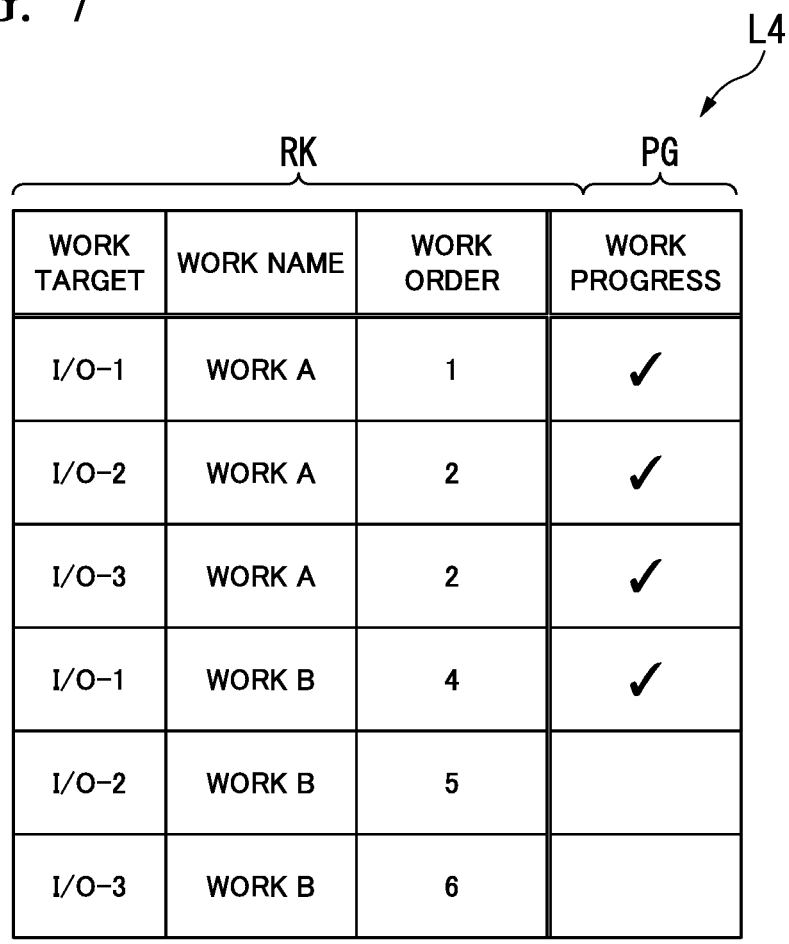
FIG. 7 is a diagram which shows an example of a work order list used in one or more embodiments of the present invention.

FIG. 7 is a diagram which shows an example of a work order list used in one or more embodiments of the present invention. The work order list L4 is also issued by the engineering server 10, and used in the engineering client 20. The work order list L4 is used to specify a work order of work required for engineering the process control system 100.

The work order list L4 includes, as shown in FIG. 7, work order information RK which is information indicating the work order described above. The work order information RK is information in which "work target," "work name," and "work order" are correlated with each other. That is, the work order information RK is information indicating that work specified by "work name" to be performed on "work target" is implemented in an order specified by "work order." For example, it is specified that work with a work name "work A" performed on a work target "I/O-1" is performed in a work order "1" in FIG. 7.

The work required for engineering the process control system 100 includes work that may be performed in parallel and work that needs to be performed in series. In the case of the former work, the same value is specified in "work order," and, in the case of the latter work, different values are specified in "work order." For example, in FIG. 7, work with a work name "work A" performed on a work target "I/O-2" and work with a work name "work A" performed on a work target "I/O-3" correspond to the former work, and the same value "2" is specified in the work order. The former work may be implemented at the same time, and may also be implemented in a back-and-forth relationship each other. For example, work with a work name "work B" performed on the work targets "I/O-1 to I/O-3" corresponds to the latter work, and different values "4 to 6" are specified in the work order.

Work progress information PG is correlated with the work order information RK in the work order list L4. This work progress information PG is information indicating whether each work specified in the work order information RK has been completed. Information indicating a work completion (for example, a check sign, a tick mark, a flag, and the like) is attached to completed work among respective pieces of work specified in the work order information RK as the work progress information PG.

Figure 8:
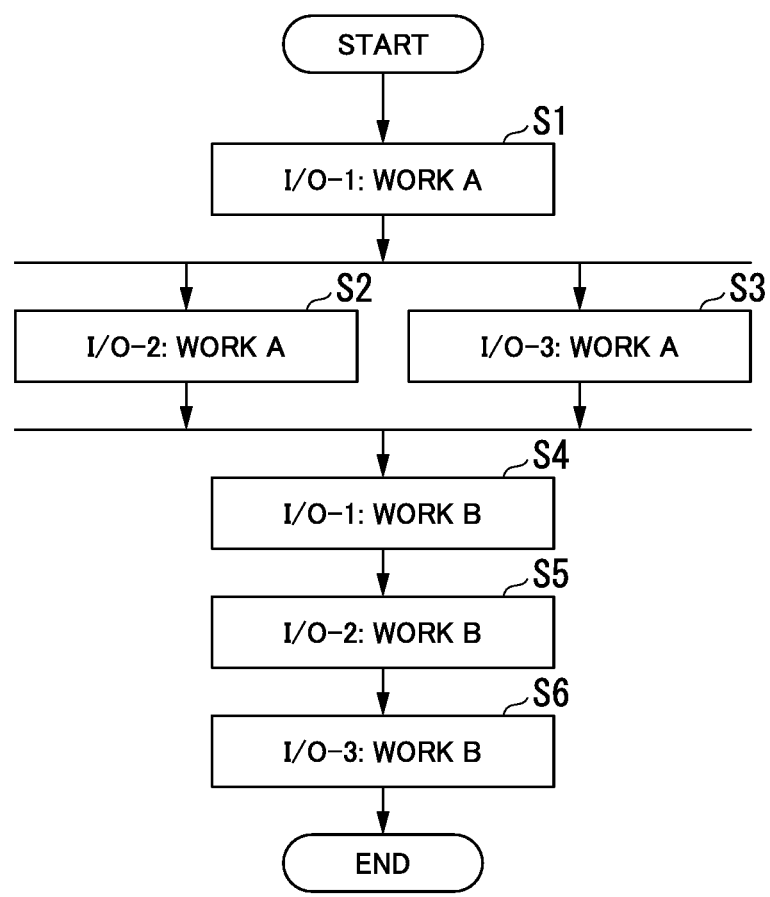
FIG. 8 is a flowchart which shows implemented work in accordance with the work order list shown in FIG. 7.

FIG. 8 is a flowchart which shows implemented work according to the work order list shown in FIG. 7. In the work order list L4 shown in FIG. 7, a work order specified for work with a work name "work A" performed on the work target "I/O-1" is "1", and a work order specified for work with a work name "work A" performed on the work targets "I/O-2 and I/O-3" is "2". For this reason, as shown in FIG. 8, work (step S2 and S3) with a work name "work A" performed on the work targets "I/O-2 and I/O-3" is performed after work (step S1) with a work name "work A" performed on the work target "I/O-1" is completed.

A work order specified for work with a work name "work B" performed on the work target "I/O-1" is "4", and a work order specified for work with a work name "work A" performed on the work targets "I/O-2 and I/O-3" is "2" in the work order list L4 shown in FIG. 7. For this reason, as shown in FIG. 8, the work (step S4) with a work name "work B" performed on the work target "I/O-1" is performed after both pieces of work (step S2 and S3) with a work name "work A" performed on the work targets "I/O-2 and I/O-3" are completed. In other words, if both pieces of work of step S2 and S3 are not completed, work of step S4 cannot be started.

In addition, in the work order list L4 shown in FIG. 7, work orders specified for work with a work name "work B" performed on the work targets "I/O-1 to I/O-3" are "4 to 6", respectively. For this reason, as shown in FIG. 8, work (step S4) with a work name "work B" performed on the work target "I/O-1", work step S5) with a work name "work B" performed on the work target "I/O-2", and work (step S6) with a work name "work B" performed on the work target "I/O-3" are performed in order. In other words, the work of step S5 cannot be started if the work of step S4 is not completed, and the work of step S6 cannot be started if the work of step S5 is not completed.

Whenever work specified in the work order information RK of the work order list L4 shown in FIG. 7 is completed, information indicating a completion of work is attached to the completed work as the work progress information PG. For example, when pieces of work of step S1 to S4 in FIG. 8 are completed, as shown in FIG. 7, a check sign is attached to work up to a fourth line (work up to work with a work name "work B" performed on the work target "I/O-1").

In one or more embodiments, it is assumed that the work instruction list L1, the work authority list L2, the user authority list L3, and the work order list L4 are issued as separate lists by the engineering server 10 for ease of understanding. However, the work instruction list L1, the work authority list L2, the user authority list L3, and the work order list L4 may be issued as one list. A list with the same content may be issued for all of the engineering clients 20a, 20b, and 20c, and a list specialized for each of the engineering clients 20a, 20b, and 20c (lists with different contents) may be issued.

[Engineering Support Method]

Next, an engineering support method according to one or more embodiments of the present invention will be described. The engineering support method according to one or more embodiments is classified into a method of performing engineering while exchanging a work list between the engineering server 10 and the engineering client 20 (hereinafter, referred to as a first support method) and a method of performing engineering while exchanging a work list between the engineering clients 20 (hereinafter, referred to as a second support method). Hereinafter, the first and second support methods will be described in a rank order.

<First Support Method>

Figure 9:
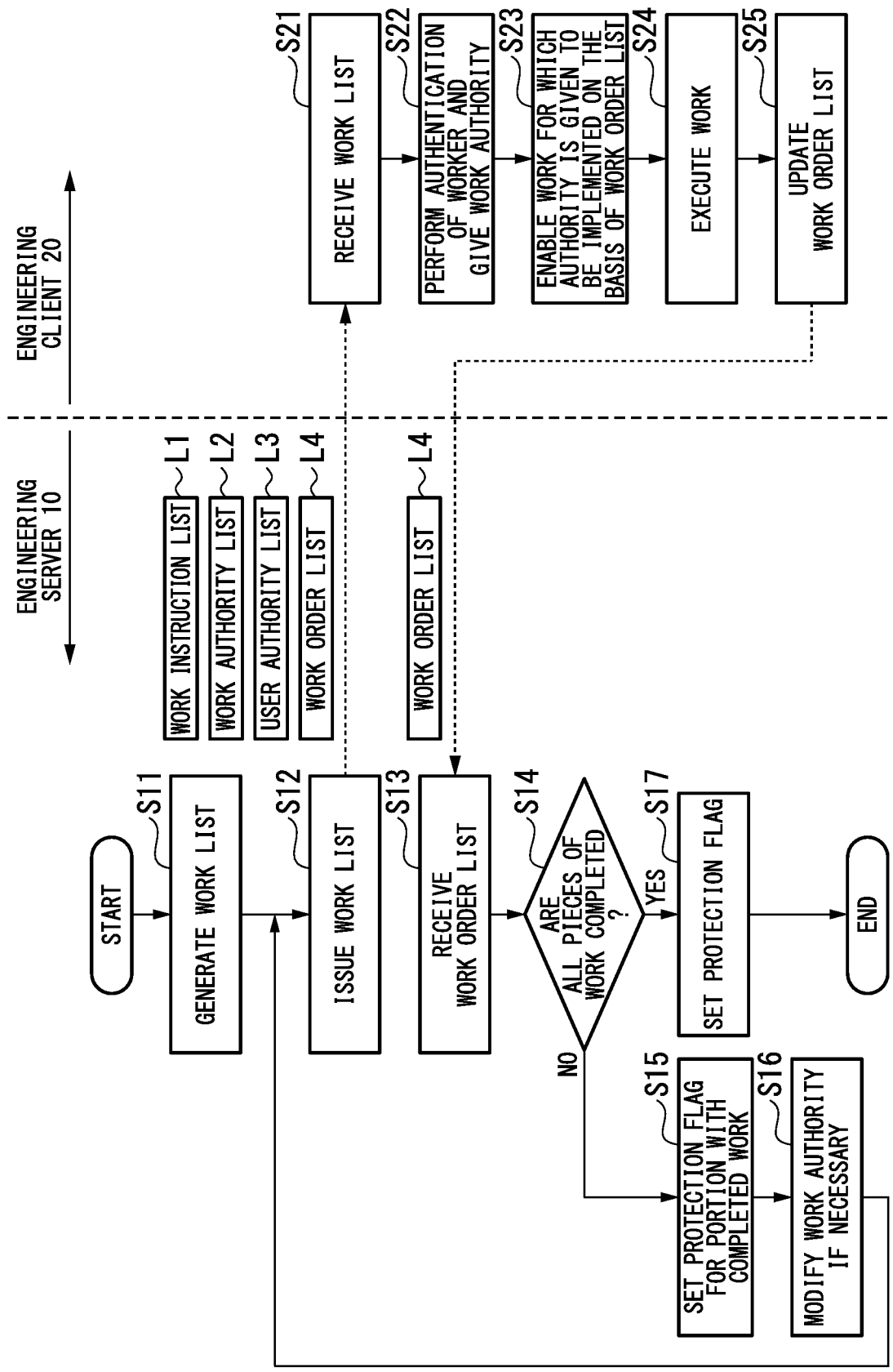
FIG. 9 is a flowchart which shows a first example of an engineering support method according to one or more embodiments of the present invention.

FIG. 9 is a flowchart which shows a first example of an engineering support method according to one or more embodiments of the present invention. As shown in FIG. 9, the engineering server 10 performs processing of creating the work lists (the work instruction list L1, the work authority list L2, the user authority list L3, and the work order list L4) (step S11). For example, the operator 11 of the engineering server 10 is operated by a system engineer or a project manager, and processing of creating a work list using design information stored in the instrumentation database 30 is performed by the work list issuer 14a of the engineering server 10 on the basis of an instruction input from the operator 11. The created work list is stored in the storage 13 of the engineering server 10.

Next, processing of issuing the created work list is performed by the work list issuer 14a of the engineering server 10 (step S12: a first step). As a result, the work list created by the engineering server 10 is transmitted from the engineering server 10 to the engineering client 20. Transmission of the work list for the engineering server 10 to the engineering clients 20b and 20c is performed, for example, via the control network N, and transmission of the work list from the engineering server 10 to the engineering client 20a is performed, for example, when the engineering client 20a is directly connected to the engineering server 10.

A work list created by the engineering server 10 may also be input to the engineering client 20 using a portable recording medium such as a universal serial bus (USB) memory. In this manner, even if the control network N cannot be used in construction of a plant, for example, a work list created by the engineering server 10 can be used in the engineering client 20.

Next, in the engineering client 20, processing of receiving a work list issued by the engineering server 10 is performed (step S21). For example, the processing of receiving a work list issued by the engineering server 10 is performed by the list transmitter and receiver 24a provided in the control processor 24 of the engineering client 20. The received work list is stored in the storage 23 provided in the engineering client 20.

Subsequently, the engineering client 20 performs authentication of a worker (user) and performs processing of giving a work authority to an authenticated worker (step S22: a second step). For example, the authentication of a worker is performed, for example, by the user authenticator 24b collating a user ID and a password for authentication input by a worker who operates the engineering client 20 operating the operator 21 with a user ID and a password for authentication held in advance. The authentication of a worker may be performed when a worker logs in to the engineering client 20 or when work using the work instruction list L1 is started.

Work authority is given to an authenticated worker by the user authorizer 24c on the basis of the work authority list L2 and the user authority list L3 received by the list transmitter and receiver 24a. For example, if it is assumed that an authenticated worker is "AAA", the role of "field engineer" is assigned to the worker "AAA" from the user authority list L3 shown in FIG. 6. As a result, processing of giving a work authority for an item whose role Q1 is a row of "field engineer" and whose scope of work is "field" to the worker "AAA" is performed by the user authorizer 24c on the basis of the work authority list L2 shown in FIG. 5.

As described above, the work authority list L2 is a list in which availability information ED that specifies whether modification of each item of the work instruction list L1 is permitted is correlated with the role Q1 of a worker. For this reason, the processing described above is performed by the user authorizer 24c, and thereby work authority for work to be implemented among pieces of work (items) specified in the work instruction list L1 to an authenticated worker. For example, the worker "AAA" is given work authority for work such as "communication method," "device address," "device model name," "channel information," "I/O channel test result," and "field device test result" among items of the input/output information J1 of the work instruction list L1 shown in FIG. 4A.

If work authority giving to a worker is completed, processing of enabling work for which work authority is given to be implemented in a work order specified in the work order list L4 is performed by the work implementer 24d (step S23: a third step). For example, in the work order list L4 shown in FIG. 6, since work whose work order is specified as "1" is work with a work name "work A" performed on the work target "I/O-1" (work of step S1 in FIG. 8), processing of enabling this work to be implemented is performed by the work implementer 24d.

If the processing described above is performed, work enabled to be implemented is implemented using the engineering client 20 on the basis of an instruction of a worker (step S24). For example, the work described above (work with a work name "work A" performed on the work target "I/O-1" (work of step S1 in FIG. 8)) for which the worker "AAA" is given work authority on the basis of an instruction of the worker "AAA" is implemented by the work implementer 24d.

If the work described above is completed (completed without abnormality occurring), processing of updating the work order list L4 is performed by the work order list updater 24e (step S25). For example, when the work with a work name "work A" (the work of step S1 in FIG. 8) performed on the work target "I/O-1" is performed and completed in the example described above, processing of attaching a check sign to the above work (the work with a work name "work A" performed on the work target "I/O-1") included in the work order information RK of the work order list L4 is performed by the work order list updater 24e. The update of the work order list L4 may also be performed manually on the basis of an instruction of a worker.

Subsequently, processing of transmitting an updated work order list L4 is performed by the list transmitter and receiver 24a of the engineering client 20. As a result, the work order list L4 updated by the engineering client 20 is transmitted from the engineering client 20 to the engineering server 10. The transmission of the work order list L4 from the engineering clients 20b and 20c to the engineering server 10 is performed, for example, via the control network N. The transmission of the work order list L4 from the engineering client 20a to the engineering server 10 is performed, for example, when the engineering client 20a is directly connected to the engineering server 10.

The work order list L4 updated by the engineering client 20 may be input to the engineering server 10 using a portable recording medium such as a USB memory. In this manner, for example, even when the control network N cannot be used in the construction of a plant, the work order list L4 updated by the engineering client 20 can be referred to by the engineering server 10.

Next, the engineering server 10 performs processing of receiving the work order list L4 transmitted from the engineering client 20 (step S13). For example, the processing of receiving the work order list L4 issued by the engineering client 20 is performed by the work progress checker 14b provided in the processor 14 of the engineering server 10. When the work order list L4 is issued by the plurality of engineering clients 20, processing of individually receiving each work order list L4 is performed.

If the work order list L4 is received, processing of confirming whether all pieces of work are completed is performed by the work progress checker 14b of the engineering server 10 (step S14). When it is determined that all pieces of work are not completed (when a determination result in step S14 is "NO"), processing of setting a protection flag only for a portion with completed work is performed by the protection setter 14c (step S15). For example, if the work in the example described above (the work with a work name "work A" performed on the work target "I/O-1" in FIG. 7 (the work of step S1 in FIG. 8)) is setting work for an I/O channel in which the I/O tag T1, which is "I/O-1" in the work instruction list L1 shown in FIG. 4A, is set, an I/O protection flag is set as the I/O protection information PR in a row of the I/O tag T1 which is "I/O-1." Such setting is performed to prevent erroneous editing thereafter.

If the processing described above ends, processing of modifying work authority if necessary is performed by the work authority changer 14d of the engineering server 10 (step S16). Such modification of work authority includes, for example, a case in which work authority is modified to a higher-ranking (higher skilled) worker when any problem on work has occurred, and the like. When there is no need to modify work authority, the processing of step S16 is omitted. Then, if the processing of step S16 ends, the processing of issuing a work list is performed again (step S12).

On the other hand, when it is determined that all pieces of work are completed (when the determination result in step S14 is "YES"), processing of setting a protection flag for all pieces of work is performed by the protection setter 14c (step S17). That is, a protection flag is also set for a portion in which previous work is considered not to be completed, and accordingly, a protection flag is set for all pieces of work. A series of processing shown in FIG. 9 are completed by the processing described above.

The series of processing shown in FIG. 9 end after a protection flag may be set for all pieces of work. However, if there is a clear cause, although a protection flag is not set for all pieces of work, it is possible to end the series of processing shown in FIG. 9. As such a case, for example, there is a case in which procurement of a part needing to be replaced is not made in time and work cannot be completed.

As described above, in the first support method, each of the engineering server 10 and the engineering client 20 is caused to issue the work lists including information on work required for engineering the process control system 100 (the work instruction list L1, the work authority list L2, the user authority list L3, and the work order list L4). Then, the engineering client 20 gives a work authority to each worker on the basis of a work list issued by the engineering server 10 and enables work for which work authority is given to be implemented in a work order specified in advance. For this reason, it is possible to reduce work errors while securing an engineering quality.

<Second Support Method>

Figure 10:
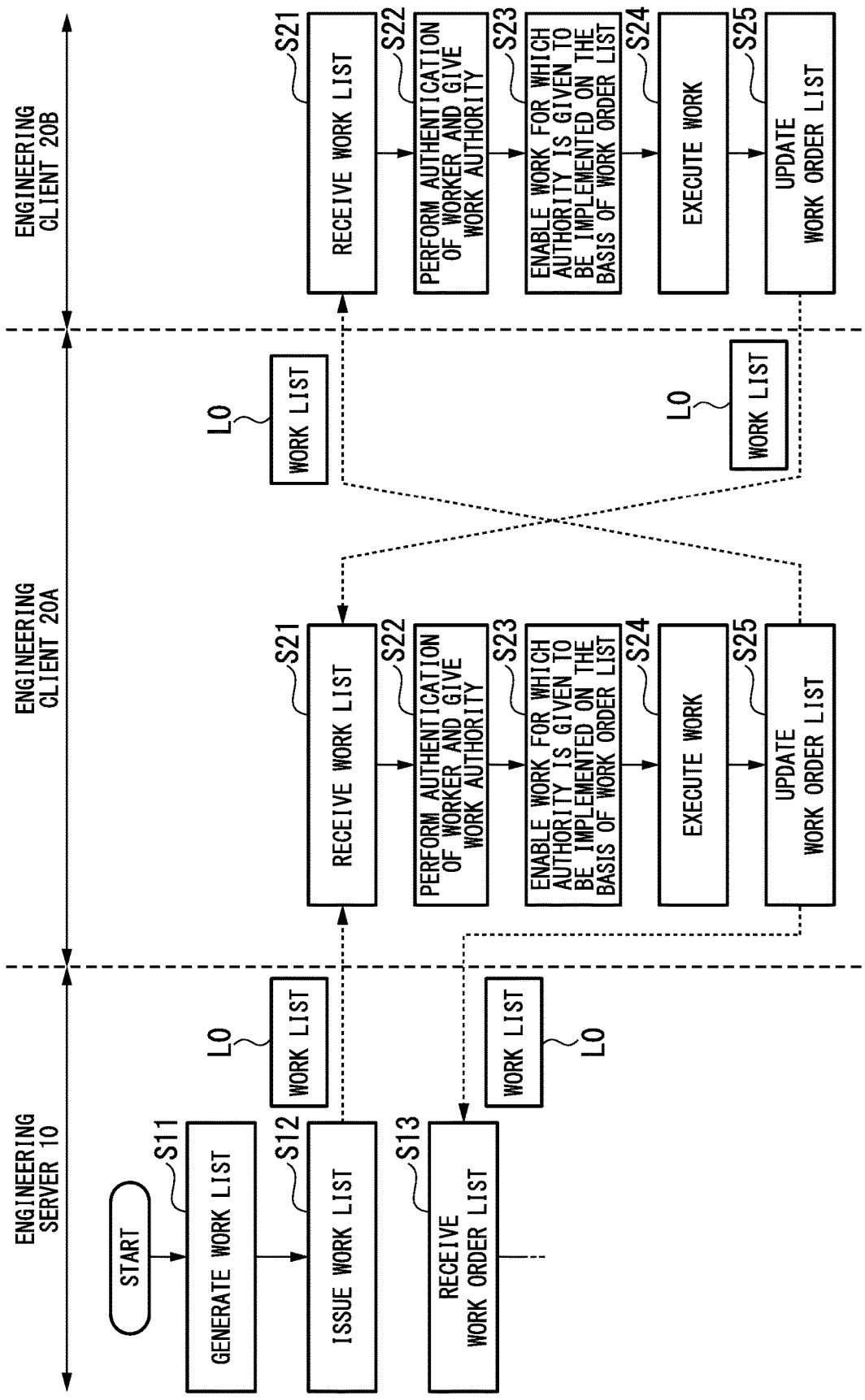
FIG. 10 is a flowchart which shows a second example of the engineering support method according to one or more embodiments of the present invention.

FIG. 10 is a flowchart which shows a second example of an engineering support method according to one or more embodiments of the present invention. In FIG. 10, the work instruction list L1, the work authority list L2, the user authority list L3, and the work order list L4 are shown as a work list L0. Showing of step S14 to S17 shown in FIG. 9 is omitted in FIG. 10. The same reference numeral is given to the same processing as the processing shown in FIG. 9. The second support method is different from the first support method described above in that engineering is performed while exchanging the work list L0 between the engineering clients 20 (20A and 20B).

In the second support method like the first support method described above, the engineering server 10 creates the work list L0 (the work instruction list L1, the work authority list L2, the user authority list L3, and the work order list L4) (step S11), and processing of issuing the created work list L0 (step S12) is performed. It is assumed that the work list L0 is transmitted from the engineering server 10 to the engineering client 20A. After the transmission of the work list L0 is completed, the engineering server 10 may be disconnected from the engineering clients 20A and 20B.

If the work list L0 is transmitted, the engineering client 20A performs processing of receiving a work list (step S21) and authentication of a worker (user), and performs processing of giving a work authority to an authenticated worker (step S22). Subsequently, the engineering client 20A performs processing of enabling work for which work authority is given to be implemented in a work order specified in the work list L0 (the work order list L4) (step S23). Thereafter, work enabled to be implemented is implemented using the engineering client 20 (step S24) and processing of updating the work order list L4 included in the work list L0 (step S25) is performed.

If the processing described above ends, the work list L0 including an updated work order list L4 is transmitted from the engineering client 20A to the engineering client 20B. If the work list L0 is transmitted, the engineering client 20B performs the same processing as the processing performed by the engineering client 20A using the transmitted work list L0. That is, processing of receiving the work list (step S21), processing of performing the authentication of a worker (user), and giving a work authority to an authenticated worker (step S22), and processing of enabling work for which work authority is given to be implemented in a work order specified in the work list L0 (the work order list L4) (step S23) are performed. Then, the work enabled to be implemented is implemented using the engineering client 20 (step S24), and processing of updating the work order list L4 included in the work list L0 (step S25) is performed.

If the processing described above ends, the work list L0 including the updated work order list L4 is transmitted from the engineering client 20B to the engineering client 20A. If the work list L0 is transmitted, the engineering client 20A performs the same processing as previous processing using the transmitted work list L0. In this manner, work is performed in a work order specified in the work list L0 (the work order list L4) while exchanging the work list L0 between the engineering clients 20A and 20B.

For example, if all pieces of work specified in the work order list L4 included in the work list L0 are completed, the work list L0 is transmitted from the engineering client 20A to the engineering server 10. The transmission of the work list L0 to the engineering server 10 may be performed whenever a part of work specified in the work order list L4 included in the work list L0 is completed. Then, the engineering server 10 performs the processing of receiving the work list L0 transmitted from the engineering client 20A (step S13) and performs the processing of step S14 to S17 shown in FIG. 9 in the same manner.

Figure 11A:
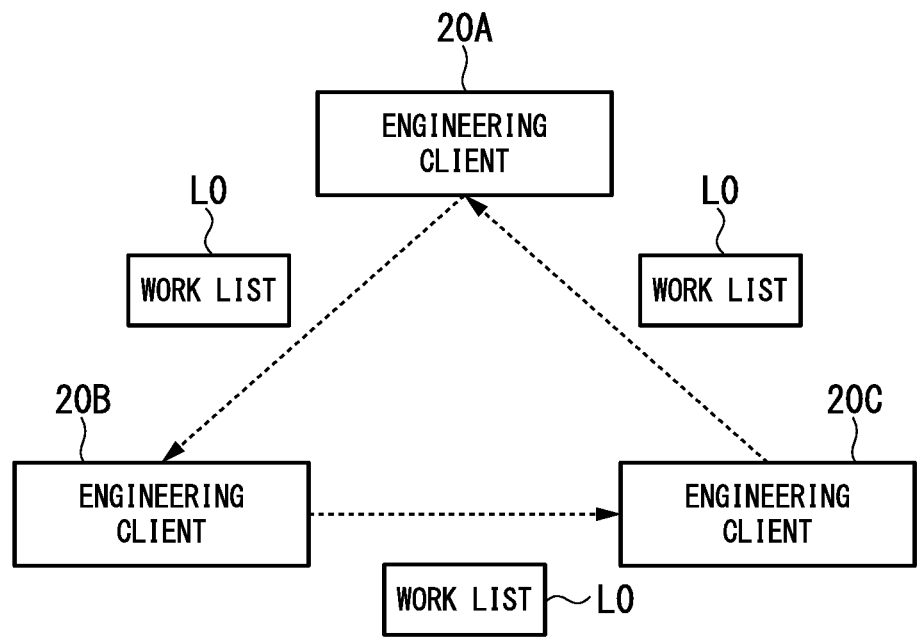
FIGS. 11A and 11B are flowcharts which show variation of the engineering support method according to one or more embodiments of the present invention.
Figure 11B:
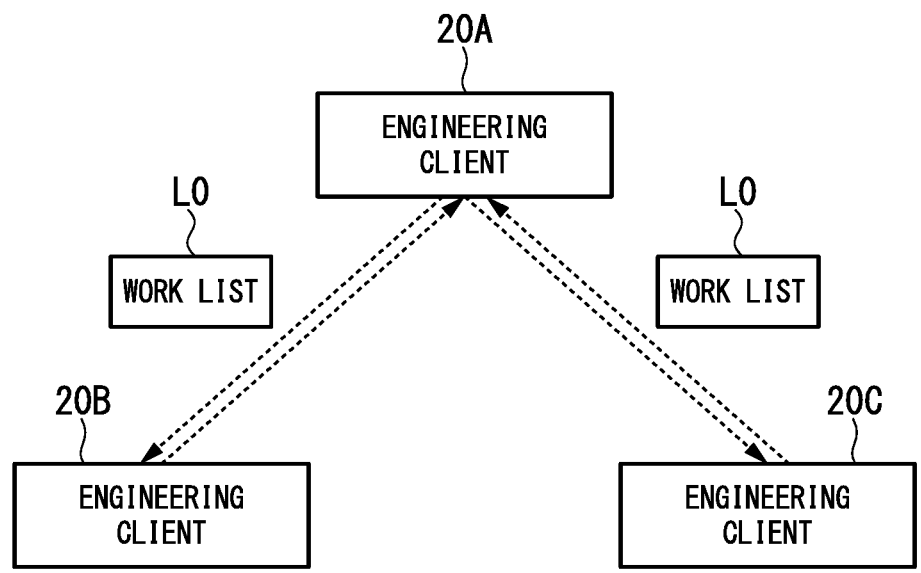
Figure 12:
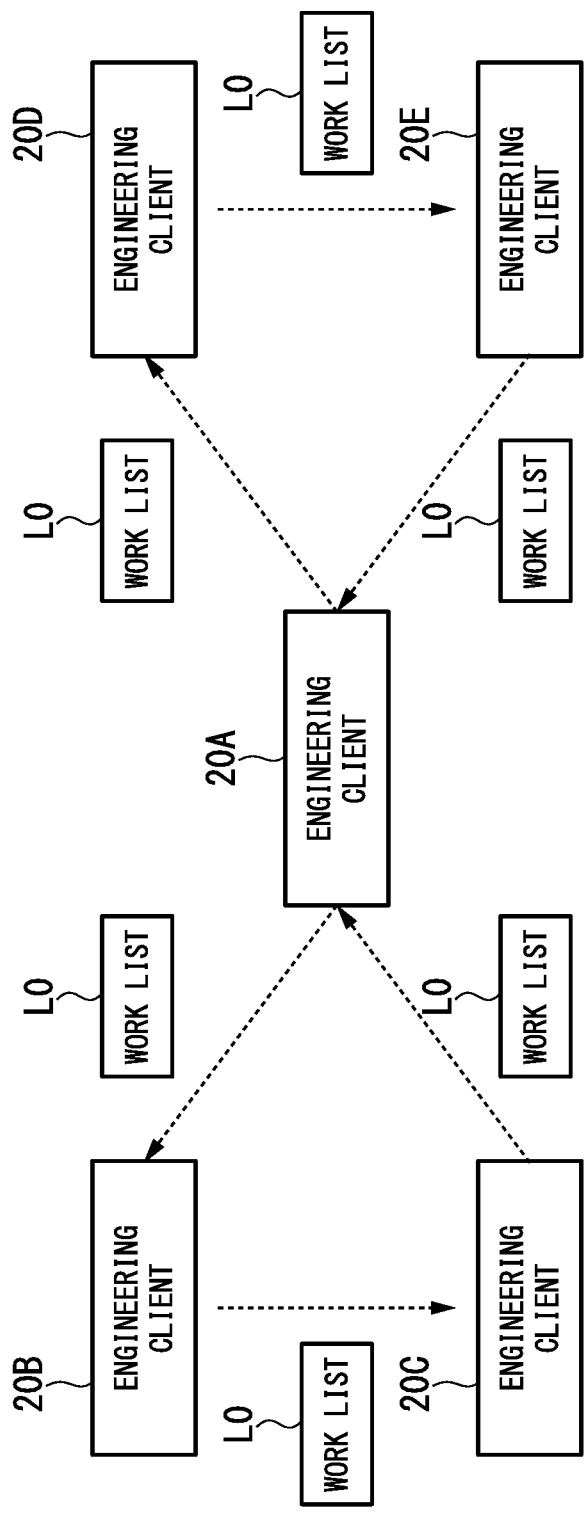
FIG. 12 is a flowchart which shows a modification of the engineering support method according to one or more embodiments of the present invention.

The number of the engineering clients 20 which perform engineering while exchanging the work list L0 may be three or more. FIGS. 11A, 11B, and 12 are flowcharts which show modifications of an engineering support method according to one or more embodiments of the present invention. In the present modifications, the work list L0 is exchanged between three engineering clients 20 (20A, 20B, and 20C).

In the variation shown in FIG. 11A, the work list L0 is exchanged in the order of the engineering client 20A, the engineering client 20B, and the engineering client 20C. In the variation shown in FIG. 11B, the engineering client 20A becomes a master, the engineering clients 20B and 20C become slaves, the work list L0 is exchanged between the engineering client 20A and the engineering client 20B, and the work list L0 is exchanged between the engineering client 20A and the engineering client 20C.

The master engineering client 20 (20A) takes an initiative in exchanging the work list L0 performed between the slave engineering clients 20 (20B and 20C). The engineering client 20 which also exchanges the work list 10 with the engineering server 10 among the engineering client 20A, the engineering client 20B, and the engineering client 20C (the engineering client 20A in the example shown in FIG. 11B) can be regarded as a master. The master engineering client 20 can ascertain an overall progress by referring to the work order list L4 included in the work list L0.

The modification shown in FIG. 12 is a combination of the variation shown in FIG. 11A and the variation shown in FIG. 11B. That is, in the modification shown in FIG. 12, the engineering client 20A is a master, and the engineering clients 20B, 20C, 20D, and 20E are slaves. Then, the work list L0 is exchanged in the order of the engineering client 20A, the engineering client 20B, and the engineering client 20C, and the work list L0 is exchanged in the order of the engineering client 20A, the engineering client 20D, and the engineering client 20E.

As described above, in the second support method, the work list L0 issued by the engineering server 10 is issued to at least one of a plurality of engineering clients 20 (20A to 20E). Then, each of the plurality of engineering clients 20 (20A to 20E) gives a work authority to each worker on the basis of the work list L0 issued by the engineering server 10, and implements work for which work authority is given in a work order specified in advance while exchanging the work list L0 between the plurality of engineering clients 20 (20A to 20E). For this reason, it is possible to reduce work errors while ensuring engineering quality. Engineering can proceed even if the engineering server 10 is off-line.

As described above, work authority in accordance with a role or a skill can be given to a worker, and work for which work authority is given can be implemented in a work order specified in the work order list L4 in the above-described embodiments. For this reason, even if pieces of work are performed in parallel, a possibility of erroneous setting is reduced and an item whose setting is finished by setting work of one worker is prevented from being subjected to setting work again by another worker. In this manner, it is possible to reduce work errors while ensuring engineering quality in the above-described embodiments.

As described above, although the engineering support system, the engineering support method, the client device, and the storage medium according to one or more embodiments of the present invention have been described, the present invention can be freely modified within the scope of the present invention without being limited to the embodiments described above. For example, when the engineering server 10 is off-line, each of the engineering clients 20 may transmit the work list L0 to the engineering server 10 at the time of the engineering server 10 being on-line. When the engineering server 10 is off-line, the work list L0 may be input to the engineering server 10 using a portable recording medium such as a USB memory. An engineering client 20 which receives the work list L0 issued by the engineering server 10 may be different from an engineering client 20 which transmits the work list L0 to the engineering server 10.

Although an example in which the I/O protection information PR is included in the work instruction list L11 has been described in the embodiments described above, the I/O protection information PR may not have to be included in the work instruction list L11. For example, the I/O protection information PR may be prepared as a separate list from the work instruction list L11 in a state of being associated with the I/O tag T1 of the work instruction list L11. Although an example in which scope of work is included in the work authority list L2 has been described in the embodiments described above, the scope of work may be prepared as a separate list from the work authority list L2. The work lists (the work instruction list L1, the work authority list L2, the user authority list L3, and the work order list L4) may be combined into one list or may be distributed as compressed files.

In addition, the engineering server 10 and the instrumentation database 30 may be realized by, for example, cloud computing. Here, the cloud computing may be matched with a definition (definition recommended by the U.S. National Institute of Standards and Technology) described in documents specified by, for example, the following Uniform Resource Locator (URL).

http://nvlpubs.nist.gov/nistpubs/Legacy/SP/nistspecial-publication800-145.pdf https://www.ipa.go.jp/files/000025366.pdf An example in which the engineering server 10 that issues the work lists (the work instruction list L1, the work authority list L2, the user authority list L3, and the work order list L4), and the instrumentation database 30 that stores design information are implemented as separate devices has been described in the embodiments described above. However, the engineering server 10 and the instrumentation database 30 may be implemented as an integrated device. When the engineering server 10 and the instrumentation database 30 are implemented as an integrated device, design information of the instrumentation database 30 is stored in the storage 13 shown in FIG. 2.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An engineering support system that supports engineering of a process control system, the engineering support system comprising:
a server device that creates a first work list including first work order information that specifies a work order of work included in the process control system; and
a first client device that gives a work authority to each worker based on the first work list issued by the server device and that enables work on target devices included in the process control system within a scope of the work authority to be implemented in the work order, wherein
the target devices are targets of the engineering of the process control system,
the first work order information includes a work target, a work name, and the work order of each of the work in the process control system,
the first client device enables, among uncompleted work in the first work order information, a work of a highest work order to be implemented before other ones of the uncompleted work in the first work order information,
the engineering support system further comprises a second client device that communicates with the first client device via a network and that performs the work of the highest work order,
the first client device transmits, directly to the second client device and not via the server device, the first work list including:
first work progress information indicating that work enabled to be implemented has been implemented;
a first list that specifies the work included in the process control system;
a second list that specifies information on the work authority based on a role of each worker;
a third list that specifies information indicating the role of each worker; and
a fourth list that includes the first work order information, wherein the first work order information includes work order values, and work orders sharing different work order values are performed serially,
the work in the process control system is serially performed,
upon detecting that not all work indicated by the first work order information is completed, the first client device transmits, to the second client device, the first work list and a notification of the progress status of the work indicated by the first work progress information, such that the second client device can inform a user of the progress status of the first client device,
upon detecting that all the work indicated by the first work order information is completed, the first client device transmits the first work list to the server device, such that the server device can prevent the work from being performed again,
the first client device receives, directly from the second client device and not via the server device, a second work list that includes second work order information and second work progress information,
the first client device enables, based on the second work order information and the second work progress information, the work on the target devices included in the process control system to be implemented,
when a work order of work required to be performed by the first client device is set next to a work order of work required to be performed in the second client device, the first client device refers to the first work order information and the first work progress information included in the first work list, which was transmitted directly from the second client device and not via the server device, and determines whether the work required to be performed in the second client device is completed, such that the work serially performed is prevented from being concurrently performed in the first client device and the second client device, and
when the work required to be performed in the second client device is completed, the first client device enables the work required to be performed by the first client device to be implemented while the second client device does not perform the same work.

2. The engineering support system according to claim 1, wherein
the first client device transmits, to the server device, the first work list including the first work progress information indicating that work enabled to be implemented has been implemented, and
the server device sets protection information based on the first work progress information, wherein the protection information prevents only the completed portion of work from being implemented again.

3. The engineering support system according to claim 2, wherein the first client device transmits, to the server device, a part of the first work list including the first work progress information.

4. The engineering support system according to claim 1, wherein the first client device transmits, to the server device, a part of the first work list including the first work progress information.

5. The engineering support system according to claim 1, wherein the first client device adds the first work progress information indicating a completion of work to the first work list whenever the work included in the first work order information is completed.

6. The engineering support system according to claim 1, wherein the first client device adds the first work progress information indicating a completion of work to the fourth list whenever the work included in the first work order information is completed.

7. The engineering support system according to claim 1, wherein
the first client device transmits, to the server device, the first work list including the first work progress information indicating that work enabled to be implemented has been implemented, and the server device changes the work authority of each worker included in the first work list.

8. The engineering support system according to claim 1, wherein the engineering support system further comprises a third client device, the first client device transmits, to the second client device, the first work list including the first work progress information indicating that work enabled to be implemented has been implemented, the second client device refers to the first work progress information included in the first work list transmitted from the first client device and enables the work on the target devices included in the process control system to be implemented, the second client device transmits, to the third client device, the first work list including the first work progress information indicating that work enabled to be implemented has been implemented, and the third client device refers to the first work progress information included in the first work list transmitted from the second client device and enables the work on the target devices included in the process control system to be implemented.

9. The engineering support system according to claim 1, wherein the engineering support system further comprises a third client device, the first client device transmits, to the second client device and the third client device, the first work list including the first work progress information indicating that work enabled to be implemented has been implemented, and each of the second client device and the third client device refers to the first work progress information included in the first work list transmitted from the first client device and enables the work on the target devices included in the process control system to be implemented.

10. An engineering support method that supports engineering of a process control system, the method comprising:

issuing, by a server device, a first work list including first work order information that specifies a work order of work included in the process control system;

giving, by a first client device, a work authority to each worker based on the issued first work list; and enabling, by the first client device, work on target devices included in the process control system within a scope of the work authority to be implemented in the work order, wherein the target devices are targets of the engineering of the process control system, the first work order information includes a work target, a work name, and the work order of each of the work in the process control system, enabling the work further comprises enabling, among uncompleted work in the first work order information, a work of a highest work order to be implemented before other ones of the uncompleted work in the first work order information, the method further comprises:

transmitting, from the first client device directly to a second client device that communicates with the first client device via a network and that performs the work of the highest work order and not via the server device, the first work list including:

first work progress information indicating that work enabled to be implemented has been implemented;

a first list that specifies the work included in the process control system;

a second list that specifies information on the work authority based on a role of each worker;

a third list that specifies information indicating the role of each worker; and a fourth list that includes the first work order information, wherein the first work order information includes work order values, and work orders sharing different work order values are performed serially, the work in the process control system is serially performed, the method further comprises:

upon detecting that not all work indicated by the first work order information is completed, transmitting, to the second client device, the first work list and a notification of the progress status of the work indicated by the first work progress information, such that the second client device can inform a user of the progress status of the first client device;

upon detecting that all the work indicated by the first work order information is completed, transmitting the first work list to the server device, such that the server device can prevent the work from being performed again;

receiving, by the first client device, a second work list including second work order information and second work progress information directly from the second client device and not via the server device;

enabling, by the first client device, based on the second work order information and the second work progress information, the work on the target devices included in the process control system to be implemented;

when a work order of work required to be performed by the first client device is set next to a work order of work required to be performed in the second client device, referring, by the first client device, to the first work order information and the first work progress information included in the first work list, which was transmitted directly from the second client device and not via the server device, and determining whether the work required to be performed in the second client device is completed, such that the work serially performed is prevented from being concurrently performed in the first client device and the second client device; and when the work required to be performed in the second client device is completed, enabling, by the first client device, the work required to be performed by the first client device to be implemented while the second client device does not perform the same work.

11. A first client device used for implementation of work included in engineering of a process control system, the first client device comprising:

a transmitter;

a receiver;

a memory; and a processor coupled to the memory, wherein the processor:

authenticates workers using the first client device;

gives a work authority, for work to be implemented and to an authenticated worker, based on a first work list including information on work included in the process control system; and enables work, where the work authority is given to the work to be implemented, in a work order specified in first work order information included in the first work list, wherein the first work order information includes a work target, a work name, and the work order of each of the work in the process control system, the processor further enables, among uncompleted work in the first work order information, a work of a highest work order to be implemented before other ones of the uncompleted work in the first work order information, the transmitter transmits, directly to a second client device that communicates with the first client device via a network and that performs the work of the highest work order and not via a server device, the first work list including:

first work progress information indicating that work enabled to be implemented has been implemented;

a first list that specifies the work included in the process control system;

a second list that specifies information on the work authority based on a role of each worker;

a third list that specifies information indicating the role of each worker; and a fourth list that includes the first work order information, wherein the first work order information includes work order values, and work orders sharing different work order values are performed serially, the work in the process control system is serially performed, the transmitter:

upon detecting that not all work indicated by the first work order information is completed, transmits, to the second client device, the first work list and a notification of the progress status of the work indicated by the first work progress information, such that the second client device can inform a user of the progress status of the first client device, and upon detecting that all the work indicated by the first work order information is completed, transmits the first work list to the server device, such that the server device can prevent the work from being performed again, the receiver receives, directly from the second client device and not via the server device, a second work list including second work order information and second work progress information, the processor further enables, based on the second work order information and the second work progress information, the work on target devices included in the process control system to be implemented, the target devices are targets of the engineering of the process control system, when a work order of work required to be performed by the first client device is set next to a work order of work required to be performed in the second client device, the processor refers to the first work order information and the first work progress information included in the first work list, which was transmitted directly from the second client device and not via the server device, and determines whether the work required to be performed in the second client device is completed, such that the work serially performed is prevented from being concurrently performed in the first client device and the second client device, and when the work required to be performed in the second client device is completed, the processor enables the work required to be performed by the first client device to be implemented while the second client device does not perform the same work.

12. The first client device according to claim 11, wherein the processor further:

updates the first work list to include the first work progress information indicating that work enabled to be implemented has been implemented.

13. The first client device according to claim 11, wherein the processor further adds the first work progress information indicating a completion of work to the fourth list whenever the work included in the first work order information is completed.

14. A non-transitory computer-readable storage medium storing a client program, which when executed by a computer that is a first client device causes the computer to:

perform authentication of workers, give a work authority for work to be implemented to an authenticated worker, wherein the authenticated worker is authenticated based on a first work list including information on work included in engineering of a process control system, and enable work where the work authority is given to be implemented in a work order specified in first work order information included in the first work list, wherein the first work order information includes a work target, a work name, and the work order of each of the work in the process control system, the client program further causes the computer to:

enable, among uncompleted work in the first work order information, a work of a highest work order to be implemented before other ones of the uncompleted work in the first work order information, and transmit, directly to a second client device that communicates with the first client device via a network and that performs the work of the highest work order and not via a server device, the first work list including:

first work progress information indicating that work enabled to be implemented has been implemented;

a first list that specifies the work included in the process control system;

a second list that specifies information on the work authority based on a role of each worker;

a third list that specifies information indicating the role of each worker; and a fourth list that includes the first work order information, wherein the first work order information includes work order values, and work orders sharing different work order values are performed serially, the work in the process control system is serially performed, the client program further causes the computer to:

upon detecting that not all work indicated by the first work order information is completed, transmit, to the second client device, the first work list and a notification of the progress status of the work indicated by the first work progress information, such that the second client device can inform a user of the progress status of the first client device, upon detecting that all the work indicated by the first work order information is completed, transmit the first work list to the server device, such that the server device can prevent the work from being performed again, receive, directly from the second client device and not via the server device, a second work list including second work order information and second work progress information, and enable, based on the second work order information and the second work progress information, the work on target devices included in the process control system to be implemented, the target devices are targets of the engineering of the process control system, the client program further causes the computer to:

when a work order of work required to be performed by the first client device is set next to a work order of work required to be performed in the second client device, refer to the first work order information and the first work progress information included in the first work list, which was transmitted directly from the second client device and not via the server device, and determine whether the work required to be performed in the second client device is completed, such that the work serially performed is prevented from being concurrently performed in the first client device and the second client device, and when the work required to be performed in the second client device is completed, enable the work required to be performed by the first client device to be implemented while the second client device does not perform the same work.

\* \* \* \* \*